US012165109B2

(12) United States Patent
Chen

(10) Patent No.: US 12,165,109 B2
(45) Date of Patent: Dec. 10, 2024

(54) METHODS AND APPARATUS FOR GENERATING A COMPOUND PRESENTATION THAT EVALUATES USERS AND REFINING JOB LISTINGS USING MACHINE LEARNING BASED ON FIT SCORES OF USERS AND EXTRACTED IDENTIFIERS FROM JOB LISTINGS DATA

(71) Applicant: iCIMS, Inc., Holmdel, NJ (US)

(72) Inventor: Shiying Chen, Highland Park, NJ (US)

(73) Assignee: iCIMS, Inc., Holmdel, NJ (US)

( * ) Notice: Subject to any disclaimer, the term of this patent is extended or adjusted under 35 U.S.C. 154(b) by 0 days.

(21) Appl. No.: 18/148,882

(22) Filed: Dec. 30, 2022

(65) Prior Publication Data

US 2024/0220932 A1 Jul. 4, 2024

(51) Int. Cl.
*G06Q 10/1053* (2023.01)
*G06Q 10/0631* (2023.01)

(52) U.S. Cl.
CPC .. *G06Q 10/1053* (2013.01); *G06Q 10/063112* (2013.01)

(58) Field of Classification Search
None
See application file for complete search history.

(56) References Cited

U.S. PATENT DOCUMENTS

| | | | |
|---|---|---|---|
| 2015/0006422 A1 | 1/2015 | Carter et al. | |
| 2015/0317604 A1* | 11/2015 | Bubna | G06Q 10/1053 705/321 |
| 2018/0173803 A1* | 6/2018 | Grover | G06Q 10/1053 |
| 2019/0019160 A1* | 1/2019 | Champaneria | G06N 5/04 |
| 2019/0197180 A1* | 6/2019 | Jersin | H04L 51/214 |
| 2019/0197486 A1* | 6/2019 | Jersin | G06F 16/735 |
| 2020/0065770 A1* | 2/2020 | Janapareddy | G06F 40/174 |
| 2020/0302368 A1 | 9/2020 | Mathiesen et al. | |
| 2020/0311684 A1* | 10/2020 | Ma | G06Q 10/1053 |
| 2021/0049536 A1* | 2/2021 | Krohn | G06N 20/00 |
| 2021/0142293 A1* | 5/2021 | Kenthapadi | G06F 16/212 |
| 2021/0264371 A1* | 8/2021 | Polli | A63F 13/79 |

(Continued)

OTHER PUBLICATIONS

N. Sharma, R. Bhutia, V. Sardar, A. P. George and F. Ahmed, "Novel Hiring Process using Machine Learning and Natural Language Processing," 2021 IEEE International Conference on Electronics, Computing and Communication Technologies (CONECCT), Bangalore, India, 2021, pp. 1-6, doi: 10.1109/CONECCT52877. (Year: 2021).*

(Continued)

*Primary Examiner* — Laura Yesildag
(74) *Attorney, Agent, or Firm* — Cooley LLP

(57) ABSTRACT

An apparatus includes a processor and a memory storing instructions to cause the processor to receive (1) user data associated with a user, (2) target workforce data, (3) target role data, and (4) candidate pool data, randomly select a plurality of candidates from the candidate pool data, execute a machine learning model to generate matching scores for the user and each candidate to the target role data, to produce a matching score distribution, and generate, via a statistical model, a fit score for the user based on a number of candidates in a subset of candidates, where each candidate from the subset of candidates has a matching score lower than the user matching score.

22 Claims, 4 Drawing Sheets

(56) References Cited

U.S. PATENT DOCUMENTS

| | | | |
|---|---|---|---|
| 2022/0101265 A1* | 3/2022 | Pande | G06Q 10/06 |
| 2023/0046851 A1* | 2/2023 | Ogura | G06F 40/289 |
| 2023/0072902 A1* | 3/2023 | Riggs | G06Q 10/06398 |
| 2023/0083875 A1* | 3/2023 | Rogynskyy | G06Q 50/22 |
| 2023/0214941 A1* | 7/2023 | Chevalier | G06Q 10/1053 |
| | | | 705/319 |
| 2023/0252418 A1* | 8/2023 | Stewart | G06N 7/023 |
| | | | 705/321 |
| 2023/0306351 A1* | 9/2023 | Markman | G06Q 10/1053 |

OTHER PUBLICATIONS

S. Gandhi, R. Nagesh and S. Das, "Learning skills adjacency representations for optimized reskilling recommendations," 2022 IEEE International Conference on Big Data (Big Data), Osaka, Japan, 2022, pp. 2253-2258, doi: 10.1109/BigData55660.2022. 10020405 (Year: 2022).*

M. Alamelu, D. S. Kumar, R. Sanjana, J. S. Sree, A. S. Devi and D. Kavitha, "Resume Validation and Filtration using Natural Language Processing," 2021 10th Int'l Conference on Internet of Everything, Microwave Engineering, Communication and Networks (IEMECON), Jaipur, India, 2021, pp. 1-5 (Year: 2021).*

Maree, Mohammed, Aseel B. Kmail, and Mohammed Belkhatir. "Analysis and shortcomings of e-recruitment systems: Towards a semantics-based approach addressing knowledge incompleteness and limited domain coverage." Journal of Information Science 45.6 (2019): 713-735 (Year: 2019).*

K. Dissanayake, S. Mendis, R. Subasinghe, D. Geethanjana, D. Lunugalage and D. Kasthurirathna, "Career Aura—Smart Resume and Employment Recommender," 2021 3rd International Conference on Advancements in Computing (ICAC), Colombo, Sri Lanka, 2021, pp. 353-358, doi: 10.1109/ICAC54203.2021.9671212. (Year: 2021).*

W. Shalaby et al., "Help me find a job: A graph-based approach for job recommendation at scale," 2017 IEEE International Conference on Big Data (Big Data), Boston, MA, USA, 2017, pp. 1544-1553, doi: 10.1109/BigData.2017.8258088. (Year: 2017).*

S. Ahmed, M. Hasan, M. N. Hoq and M. A. Adnan, "User interaction analysis to recommend suitable jobs in career-oriented social networking sites," 2016 International Conference on Data and Software Engineering (ICoDSE), Denpasar, Indonesia, 2016, pp. 1-6, doi: 10.1109/ICODSE.2016.7936143. (Year: 2016).*

Qin, Chuan, et al. "Enhancing person-job fit for talent recruitment: An ability-aware neural network approach." The 41st international ACM SIGIR conference on research & development in information retrieval. 2018. (Year: 2018).*

R. Nimbekar, Y. Patil, R. Prabhu and S. Mulla, "Automated Resume Evaluation System using NLP," 2019 International Conference on Advances in Computing, Communication and Control (ICAC3), pp. 1-4. Mumbai, India, 2019. (Year: 2019).*

Ramanath, Rohan, et al. "Towards deep and representation learning for talent search at linkedin." Proceedings of the 27th ACM international conference on information and knowledge management. 2018. (Year: 2018).*

D. Wei, K. R. Varshney and M. Wagman, "Optigrow: People Analytics for Job Transfers," 2015 IEEE International Congress on Big Data, New York, NY, USA, 2015, pp. 535-542, doi: 10.1109/BigDataCongress.2015.84. (Year: 2015).*

Z. Elgammal, A. Barmu, H. Hassan, K. Elgammal, T. Özyer and R. Alhajj, "Matching Applicants with Positions for Better Allocation of Employees in the Job Market," 2021 22nd International Arab Conference on Information Technology (ACIT), Muscat, Oman, 2021, pp. 1-5, doi: 10.1109/ACIT53391.2021.9677374. (Year: 2021).*

A. Aljuaid and M. Abbod, "Artificial Intelligence-Based E-Recruitments System," 2020 IEEE 10th International Conference on Intelligent Systems (IS), Varna, Bulgaria, 2020, pp. 144-147, doi: 10.1109/IS48319.2020.9199979. (Year: 2020).*

R. Ransing, A. Mohan, N. B. Emberi and K. Mahavarkar, "Screening and Ranking Resumes using Stacked Model," 2021 5th International Conference on Electrical, Electronics, Communication, Computer Technologies and Optimization Techniques (ICEECCOT), Mysuru, India, 2021, pp. 643-648, doi: 10.1109/ICEECCOT (Year: 2021).*

K. Dissanayake, S. Mendis, R. Subasinghe, D. Geethanjana, et al. "Career Aura—Smart Resume and Employment Recommender," 2021 3rd International Conference on Advancements in Computing (ICAC), Colombo, Sri Lanka, 2021, pp. 353-358, doi: 10.1109/ICAC54203.2021.9671212. (Year: 2021).*

A. Nigam, A. Roy, H. Singh and H. Waila, "Job Recommendation through Progression of Job Selection," 2019 IEEE 6th International Conference on Cloud Computing and Intelligence Systems (CCIS), Singapore, 2019, pp. 212-216, doi: 10.1109/CCIS48116.2019. 9073723. (Year: 2019).*

International Search Report for International Application No. PCT/US2023/086373 dated May 2, 2024, 5 pages.

* cited by examiner

METHODS AND APPARATUS FOR GENERATING A COMPOUND PRESENTATION THAT EVALUATES USERS AND REFINING JOB LISTINGS USING MACHINE LEARNING BASED ON FIT SCORES OF USERS AND EXTRACTED IDENTIFIERS FROM JOB LISTINGS DATA

FIELD

The present disclosure generally relates to the field of machine learning and presentation processing. In particular, the present disclosure relates to methods and apparatus for generating a compound presentation that evaluates users and refining job listings using machine learning based on fit scores of users and extracted identifiers from job listings data.

BACKGROUND

Employers and potential candidates are often connected through computer systems such as applicant tracking systems (ATSs). ATSs typically use machine learning to match thousands of candidates with job listings on various platforms to help employers and hiring managers to identify suitable candidates for their job listings. Typically, an ATS provides a ranked list of candidates corresponding to a search request of a job listing. The candidates are typically selected and ranked by the ATS based on the scores calculated via machine learning using a variety of factors, such as skills, work experience, location, interests, etc. The scores, however, only reflect how relevant or similar a candidate is to a given job and fail to provide insight on how competitive a candidate is to the job compared to other similar candidates in the market.

In some cases, a candidate with a low matching score for a job listing does not indicate that the candidate is not unsuitable for the job, but rather that the job listing is poorly written, too specific, or lacks meaningful descriptions, leading to the low matching score.

Thus, it is desirable to develop a scoring system that not only reflects how strong a candidate is to a job compared to other similar candidates in the market based on the relevancy and similarity between potential candidates and the given job, but also provide insights about how attractive a job is to the top candidates in the market and what could be improved to win more competitive candidates.

SUMMARY

In one or more embodiments, an apparatus includes a processor and a memory operatively coupled to the processor. The memory stores instructions to cause the processor to receive (1) user data associated with a user, (2) target workforce data, (3) target role data associated the target workforce data, and (4) candidate pool data associated with the target workforce data, where the candidate pool data includes a set of candidate data. The memory further stores instructions to cause the processor to randomly select a set of candidates from the candidate pool data, where each candidate from the set of candidates is associated with role data from a role pool from the target workforce data. The instructions further cause the processor to execute a machine learning model to generate (1) a user matching score for a user based on a comparison between the user data and the target role data, and (2) a candidate matching score from a set of candidate matching scores for each candidate from the set of candidates, based on a comparison between (i) candidate data from the set of candidate data and (ii) the role data from the role pool, to produce a matching score distribution that is associated with the target workforce data. The memory stores instructions to further cause the processor to calculate, via a statistical model, a fit score for the user based on a number of candidates in a subset of candidates from the set of candidates, where each candidate from the subset of candidates has a candidate matching score lower than the user matching score, and the fit score includes a percentile rank within the matching score distribution. The instructions further cause the processor to generate a user evaluation for the user based on the user matching score and the fit score for the user. The user evaluation indicates a likelihood that the user is to match with the target role data based on the target workforce.

In one or more embodiments, an apparatus a processor and a memory operatively coupled to the processor. The memory stores instructions to cause the processor to receive (1) target workforce data and (2) candidate pool data associated with the target workforce data. The candidate pool data includes a set of candidate data. The memory stores instructions to further cause the processor to randomly select a set of candidates from the candidate pool data, where each candidate from the set of candidates is associated with role data from a role pool from the target workforce data. The memory stores instructions to further cause the processor to execute a machine learning model to generate a candidate matching score from a set of candidate matching scores for each candidate from the set of candidates, based on a comparison between (1) candidate data from the set of candidate data and (2) the role data from the role pool, to produce a matching score distribution that is associated with the target workforce data. The memory stores instructions to further cause the processor to calculate, via a statistical model, a fit score from a set of fit scores for each candidate from the set of candidates. The set of fit scores includes a set of percentile ranks within the matching score distribution. The memory stores instructions to further cause the processor to filter, via the processor, the set of candidates associated with the target workforce data, based on the set of fit scores and a fit score threshold, to produce a filtered candidate pool. The memory stores instructions to further cause the processor to extract a plurality of natural language-based identifiers from a plurality of role data from the target workforce data. The instructions further cause the processor to generate a role improvement recommendation for the target role data based on the plurality of fit scores of the filtered candidate pool and the plurality of natural language-based identifiers, the role improvement recommendation configured to refine the target role data by embedding a plurality of natural language-based identifiers into the target role data, to produce an updated target role data.

In one or more embodiments, a non-transitory, processor-readable medium is presented. The non-transitory processor readable medium stores instructions to cause a processor to receive (1) target workforce data, (2) candidate pool data associated with the target workforce data, and (3) target role data. The instructions further cause the processor to execute a machine learning model to generate a candidate matching score from a set of candidate matching scores for each candidate from a set of candidates that is randomly-selected from the candidate pool data, to produce a matching score distribution for the target workforce data based on the target workforce data, the candidate pool data, and the target role data. The instructions further cause the processor to calculate, via a statistical model, a fit score from a set of fit scores for each candidate from the set of candidates based on the matching score distribution. The instructions further cause the processor to filter the set of candidates associated with the target workforce data based on the set of fit scores and a fit score threshold, to produce a filtered candidate pool that includes a filtered subset of candidates from the set of candidates. The instructions further cause the processor to generate, an appeal value for the target role data based on a comparison of (1) a set of role data from a role pool from the target workforce data associated with the filtered subset of candidates and (2) the target role data. The instructions further cause the processor to extract a plurality of natural language-based identifiers from the plurality of role data having higher appeal values than the appeal value for the target role data; and generate a role improvement recommendation based on the plurality of natural language-based identifiers extracted from the plurality of role data and the plurality of fit scores, the role improvement recommendation configured to increase the appeal value for the target role data.

DETAILED DESCRIPTION

Figure 1:
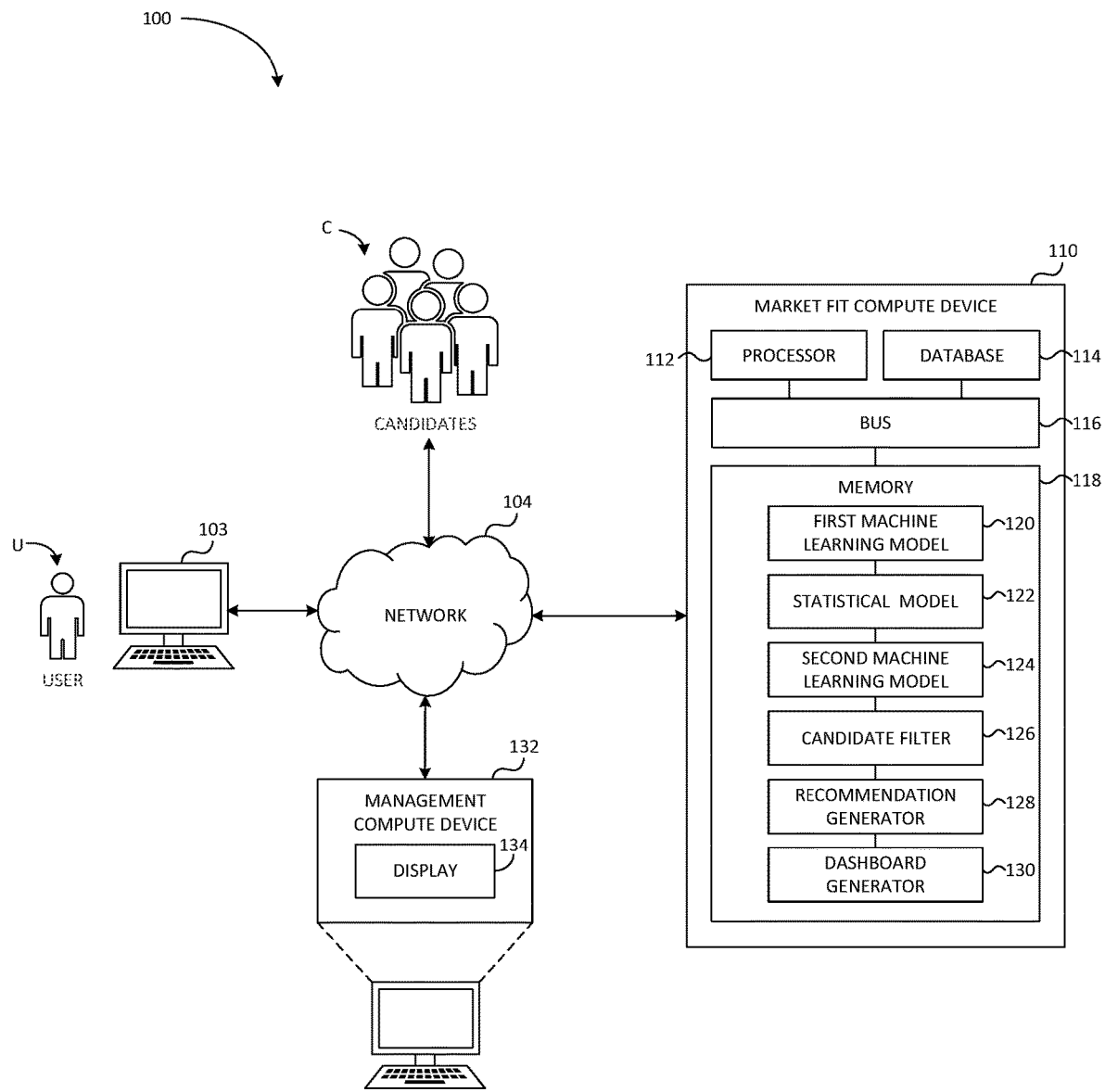
FIG. 1 is a block diagram of a system for evaluating candidates and refining job listings using machine learning based on fit scores, according to an embodiment.

Some embodiments can generate a fit score of a user that describes the user's competitiveness compared to other candidates within any job market. Such embodiments can provide, to an employer, how competitive the user is, compared to the other candidates within a job market shared with the employer, to one or more job listings of the employer. An apparatus incorporates machine learning (or artificial intelligence) to generate a matching score for the user based on the user's job-related information, such as, for example, job title, job responsibilities, experience level, previous employers, location, industry, field in the industry, education, and/or the like. The matching score of the user can also be generated based on information about the user and a job listing(s) to which that the user applied and/or applies. The job listing(s) can be posted online and/or on a digital platform that candidates can view and/or engage with (e.g., click on the job listing(s), apply to the job listing(s), etc.). The apparatus can generate matching scores for multiple candidates that have also applied to the job listing(s) of the same employer. A matching score can be, for example, a raw score assigned to a candidate, based on information of a resume associated with the candidate and information of a job listing, indicating a level of similarity or matching the candidate is to the job listing. The apparatus can also generate matching scores for other candidates who have applied to other job listings different from the job listings provided by other employers. In some cases, the user can have multiple matching scores for multiple job listings from multiple employers, where each matching score can be different based on each job listing and each employer of that job listing. The matching scores can be used by employers to gauge how each candidate (including the user) fairs against each other based on individual information between each candidate and the job listings of the employer.

Some embodiments can also incorporate statistical modeling to generate and/or calculate a fit score based on a distribution of the matching scores of all the candidates within the market associated with the employer and/or job(s) associated with the employer. In other words, the fit score can be deterministic of a competitiveness of a candidate compared to market conditions. For example, information describing job demand of a specific market, number of employees within the specific market, influx/outflux of employees entering/exiting the specific market, job turnover rate, number of employees across various seniority levels, and/or the like. The fit score can also be influenced by demographic information about each candidate, such as, for example, gender, age, ethnicity, and/or the like. The fit score can include a numerical value with a range from 0 to 100 where a higher fit score indicates how strong a candidate is compared to other candidates in a specific market. The specific market could be associated with a job category, job location, job title, job functions, and/or the like. The specific market can also be further segmented by biographic data such as gender, ethnicity, age, and/or the like. In some implementations, a candidate with a fit score of 80 means that the candidate's fit score is greater than 80% of other candidates in the specific market. In some cases, a candidate having a fit score greater than a percentage of candidates in a specific market can mean that the candidate is better than that percentage of candidates in the specific market. In some cases, a higher fit score can mean that the candidate has a greater chance of being matched and/or selected for job listings within the specific market. In some cases, a higher fit score can mean that the candidate has a competitive advantage compared to other candidates. The apparatus can generate and/or calculate fit scores for each candidate and provide them to employers so that the employers can select candidates based on the fit scores.

A statistical model can be, for example, a type of machine learning model, configured to generate and/or predict fit scores of candidates using population-based data. The statistical model can include, linear models, logistic regression models, time series models, an analysis of variation (ANOVA), and/or the like. In some implementations, the statistical model can be trained to produce a second machine learning model (or another machine learning model and/or trained machine learning model).

Some embodiments, the apparatus of the present disclosure can generate a virtual dashboard containing various information about the candidates to an employer. The virtual dashboard can provide a visual display of candidates and their associated matching scores and associated fit scores. The apparatus can also filter multiple candidates based on fit scores of the candidates so that employers can view candidates having fit scores above a fit score threshold set by the employers. The virtual dashboard can also provide insights about how attractive an employer's job listings are for the candidates. The apparatus can also generate recommendations to improve the job listings of the employers to better attract candidates with higher fit scores by, for example, broadcasting jobs in multiple job boards, clarifying job responsibilities, modifying job listings to be remote friendly, and/or the like.

Some embodiments generate a fit score of a candidate (including the user) that can be an evaluation of the candidate's competitiveness for a job by comparing the candidate's matching score to the distribution of matching scores of candidates in a given market. So the fit score not only can be an assessment of the candidate's qualification towards a job but also can reflect the candidate's position relative to other candidates in a dynamic market. The fit score can also be a descriptive statistic such as, for example, an average, a median, a percentile, a minimum/maximum, or the like, of the fit scores of the candidates. The fit score can be used by employers to evaluate how attractive their job listings are compared to other similar job listings in a shared market. In some implementations, the fit scores can also be descriptive of historical statistics such as, for example, an average, a median, a percentile, or a minimum/maximum, or the like, of fit scores of previously hired candidates and an average, a median, a percentile, or a minimum/maximum, or the like, of fit scores of previous candidates that applied for the job listing. The fit scores can further be used by employers to evaluate how attractive their current job listings are compared to their previous and/or older job listings. The apparatus can also group candidates into various tiers based on their fit scores. The apparatus can also find and/or filter candidates based on tiers and/or commonality of skills, qualifications, experience, source, and/or the like, of candidates for each tier so that they can refine the job requirements to better attract target candidates. The apparatus can also extract attributes such as, for example job title, skills, requirements, job location, industry, and/or the like, from previous jobs of candidates. The apparatus can also extract fit scores of candidates that have previously applied to jobs of the employer. The apparatus can also receive input from the employer that sets a role fit score goal for the employer's job listings (role fit score can be similar to fit scores) to attract candidates with higher fit scores.

Some embodiments of the apparatus can train machine learning model(s) to predict if a newly created job listing could meet the role fit score goal or not. For instance, the machine learning model(s) can include a set of model parameters such as weights, biases, or activation functions that can be executed to predict raw matching scores for candidates, based on the candidates resumes and job listings to which the candidates can apply to and/or has applied. In some cases, the machine learning model(s) can also include a set of model parameters to predict a level of appeal for a job listing to candidates and/or classify a job listing into a level of appeal value to candidates. For instance, an average, a medium, a percentile, or a minimum/maximum of fit scores for candidates in association with a job listing can be used to represent a role score for the job listing. Job listings with higher role scores, however, may not be indicative of a higher likelihood that candidates will be attracted to those job listings with higher scores due to various market reasons (e.g., negative media coverage of the company posting that job listing, etc.). The machine learning model(s) can be executed to predict popularity for a job posting to candidates within the market. In some cases, the machine learning model(s) can also be executed to identify and/or classify natural language-based identifiers (e.g., characters, words, phrases, etc.) of a resume document/image, a set of resume documents/images, a job listing, a set of job listings, to predict an overall score indicating appeal to candidates or potential candidates. In some cases, the machine learning model(s) can predict the score indicating appeal based on information describing skills, locations, type of jobs, job titles, and/or the like from the job listing and/or set of job listings. The machine learning model(s) can be executed during a training phase and/or an execution phase.

FIG. 1 is a block diagram of a system 100 for evaluating candidates and refining job listings using machine learning based on fit scores, according to an embodiment. The system 100 includes a market fit compute device 110, a user U operating a user compute device 103, a management compute device 132 operated by an employer (e.g., an employee in human resource department of the employer), and a network 104 configured to enable communication between the user compute device 103, the management device 132 and/or the market fit compute device 110.

The system 100 can also include a set of candidates C (also referred to as "candidates"). The candidates C can include candidates, job seekers, employees, and/or the like. The user U can also be a candidate, job seeker, employee, or the like. In some cases, the user U can also be part of the candidates C.

Candidates C can be, for example, a group of user Us (e.g., candidates, job seekers, etc.) that are associated with a job market. The job market can define a group of individuals who share similar job titles, job experience, job responsibilities, job locations, job industries, job fields, and/or the like. In some cases, the job market can be divided into specific segments. For example, a job market of computer scientists can be narrowed down based on biographic information such as, for example, gender, ethnicity, age, and/or the like. The user U can also an individual associated with the same job market as the candidates C. For instance, in a job market of consultants, the candidates C can include multiple individuals who are consultants for various industries, where one of those individuals can be considered as the user U.

The market fit compute device 110 can receive information about the user U, the candidates C, a job listing provided by the employer operating the management device 132, the job market associated with the user U and/or the candidates C, via the network 104. The market fit compute device 110 includes a processor 112 and a memory 118 that communicate with each other, and with other components, such as a database 114, via a bus 116. The database 114 can include any data storage system and/or data storage management system. The database 114 can include, for example, a local database, a cloud database, and/or the like. The bus 116 can include any of several types of bus structures including, but not limited to, a memory bus, a memory controller, a peripheral bus, a local bus, a data bus, a control bus, and/or any combinations thereof, using any of a variety of bus architectures. The market fit compute device 110 can be or include, for example, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. The market fit compute device 110 can also include multiple compute devices that can be used to implement a specially configured set of instructions for causing one or more of the compute devices to perform any one or more of the aspects and/or methodologies described herein.

The market fit compute device 100 can include a network interface (not shown). A network interface device, such as the network interface, can be used for connecting the market fit compute device 100 to one or more of a variety of networks (e.g., the network 104) and one or more remote devices connected thereto. Examples of a network interface device include, for example, a network interface card (e.g., a mobile network interface card, a LAN card), a modem, and any combination thereof. The network 104 can include a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and/or the like. The market fit compute device 110 can have (or use) a wired and/or a wireless mode of communication.

The processor 112 can be or include, for example, a hardware-based integrated circuit (IC), or any other suitable processing device configured to run and/or execute a set of instructions or code. For example, the processor 112 can be a general-purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC) and/or the like. In some implementations, the processor 112 can be configured to run any of the methods and/or portions of methods discussed herein.

The memory 118 can be or include, for example, a random-access memory (RAM), a memory buffer, a hard drive, a read-only memory (ROM), an erasable programmable read-only memory (EPROM), and/or the like. In some instances, the memory can store, for example, one or more software programs and/or code that can include instructions to cause the processor 112 to perform one or more processes, functions, and/or the like. In some implementations, the memory 118 can include extendable storage units that can be added and used incrementally. In some implementations, the memory 118 can be a portable memory (e.g., a flash drive, a portable hard disk, and/or the like) that can be operatively coupled to the processor 112. In some instances, the memory 118 can be remotely operatively coupled with another compute device such as the user compute device 103 and/or the management device 132. The memory 118 can also be remotely operatively coupled to a remotely located database. The memory 118 can include various components (e.g., machine-readable media) including a random-access memory component, a read only component, and any combinations thereof. In one example, a basic input/output system (BIOS), including basic routines that help to transfer information between elements within the market fit compute device 110, such as during start-up, can be stored in memory 118. The memory 118 can further include any number of program modules including, for example, an operating system, one or more application programs, other program modules, program data, and any combinations thereof.

The memory 118 of the market fit compute device 110 can include a first machine learning model 120, a statistical model 122, a second machine learning model 124, a candidate filter 126, a recommendation generator 128, and/or a dashboard generator 130. The first machine learning model 120 can be executed by the processor 112 to generate matching scores for a randomly-selected group of candidates from candidates C. The matching scores can include matching scores for the user U and each candidate from the randomly-selected group of candidates. The first machine learning model 120 can be or include at least one of a supervised machine learning model, an unsupervised machine learning model, a tree-based model, a deep neural network model (DNN), an artificial neural network (ANN) model, a fully connected neural network, a convolutional neural network (CNN), a residual network model, a region proposal network (RPN) model, a feature pyramid network (FPN) model, a generative adversarial network (GAN), a K-Nearest Neighbors (KNN) model, a Support Vector Machine (SVM), a decision tree, a random forest, boosting, a Naïve Bayes classifier, and/or the like. In some implementations, the first machine learning model 120 can be advantageous in classifying features of user data, candidate data, and/or job listings to identify and/or extract important features.

The statistical model 122 can be executed by the processor 112 to generate a fit score from multiple fit scores for each candidate from the set of candidates C and the user U, based on a distribution of the matching scores of candidates C and the user U. In some implementations, the statistical model 122 can use a sample of candidates, such as, for example, the randomly-selected group of candidates, to make an inference describing a competitive advantage each candidate from the randomly-selected group of candidates (including the user U) has compared to other candidates in the same job market. The competitive advantage (or lack thereof) can be defined by the fit scores. In some implementations, the statistical model 122 can be configured to generate fit scores that can be used to train a second machine learning model 124. The second machine learning model 124 can be further trained and/or executed to make better inferences in calculating competitiveness of candidates to generate more accurate fit scores. For instance, instead of using matching scores of a pre-defined number of randomly-selected candidates (or a matching score distribution) as a sample, the second machine learning model 124 can convert the matching scores into fit scores using at least the matching scores, market information, information about a number of candidates within a specific market, information about an influx/outflux of candidates within the specific market, information about activity of a monthly number of candidates within the specific market, and/or the like.

The second machine learning model 124 can be or include any machine learning model, neural network, tree-based model, and/or the like. The second machine learning model 124 can include (or be) a supervised machine learning model or an unsupervised machine learning model. In some implementations, the second machine learning model 124 can be used to generate fit scores of future candidates instead of the statistical model 122. This is so, at least in part, to predict fit scores of future candidates without re-sampling candidates from the same job market. In some implementations, the second machine learning model 124 can be further trained using a training set that includes previously generated fit scores of candidates, candidate information (e.g., resume, job title, work experience, education, etc.), information about job listings (e.g., location, required skills, qualifications, benefits, etc.), information about the specific market (e.g., number of candidates in the specific market, influx/outflux of candidates in the specific market, etc.). In some cases, the training set can be labeled using the fit scores as the label. The training set can be used to train the second machine learning model 124 to predict fit scores without using matching scores of candidates (which were used to generate fit scores via the statistical model 122).

The candidate filter 126 can be or include a program and/or section of code configured to, when executed by the processor 112, examine inputs including, for example, the fit scores of candidates C (and the fit score of the user U) to output a subset of matching scores based on a qualifying criteria (e.g., a fit score threshold).

The recommendation generator 128 can be or include a software program and/or routine used to generate, when executed by the processor 112, a role improvement recommendation to enable the employer to modify and/or update the job listing provided by the employer. For instance, the role improvement recommendation can be configured to, when executed, to embed extracted common natural language-based identifiers associated with high candidate engagement into the job listing. In some cases, the role improvement recommendation can be configured to remove words and/or phrase in the job listing associated with low candidate engagement. The dashboard generator 130 can be or include a software program and/or routine used that, when executed by the processor 112, outputs a compound presentation that displays the role improvement recommendation on a display 134 of the management device 132. In some implementations, the recommendation generator 128 can be or include any machine learning model and/or neural network as described herein. The market fit compute device 110 and its components and functions are further described in detail below with respect to FIG. 2.

In some implementations, the market fit compute device 110 can include (or be) a server and receive requests from multiple devices including, for example, multiple management devices operated by multiple employers to provide insight on how competitive candidates C (including the user U) are to the multiple employers. Each management device can receive, from the market fit compute device 110, an indication of how competitive each candidate is at matching with job listings of each management device, compared to other job listings in the same job market. The market fit compute device 110 can also provide, to each management device, how competitive the job listings of each management device are compared to other job listings from other management devices operated by employers in the same job market.

The market fit compute device 110 can receive information about the user U, information about the candidates C, information about various markets including the market associated with the user U and the candidates C, and information about the employer operating the management device 132 and its job listings, via the network 104. The user U can operate the user compute device 103 to communicate with and send information to the market fit compute device 110 via a connection to the network 104. In some cases, the market fit compute device 110 can receive information about each candidate operating a candidate device (not shown). The user compute device 103 and the candidate devices can be, for example, similar in structure to the market fit compute device 110, albeit with different software as described herein. For instance, the user compute device 103 can include a processor (not shown in FIG. 1) and a memory (not shown in FIG. 1) operatively coupled to the processor of the user compute device 103 and stores instructions for the processor of the user compute device 103. The user compute device 103 is operated by the user U to communicate with the market fit compute device 110. The user U can upload user data and transmit it to the processor 112 of the market fit compute device 110 from the processor of the user device 103.

The management device 132 can be or include a compute device operated by an employer and/or an operator. The management device 132 can be, for example, similar in structure to the market fit compute device 110, albeit with different software as described herein. For instance, the management compute device 132 can include a processor (not shown in FIG. 1) and a memory (not shown in FIG. 1) operatively coupled to the processor of the management compute device 132 and stores instructions for the processor of the management compute device 132. The processor of the management compute device 132 can receive any data, such as, for example, the compound presentation generated by the dashboard generator 130.

The management device 132 can include a processor (not shown) and a memory (not shown) operatively coupled to the processor. The management device 132 can include a display 134 configured to display the compound presentation generated by the dashboard generator 130 of the market fit compute device 110. In some implementations, the memory of the management device 132 can store instructions to cause the processor of the management device 132 to display, via the display 134 the compound presentation to the employer and/or operator. The display 134 can be or include any monitor, screen, LED screen, OLED screen, graphical user U interface (GUI) touchscreen, and/or the like. The display 134 can be configured to display the compound presentation. The compound presentation can be or include, for example, an information management tool that tracks, gathers, and displays any data outputted by the market fit compute device 110 such as, for example, fit scores, matching scores, extracted natural language-based identifiers, role improvement recommendations, and/or the like. The display 134 can be configured to present, to the employer operating the management device 132, the compound presentation including a presentation of information about the user U, candidates C, fit scores, market trends, and/or the like. The employer operating the management device 132 can interact with the display 134 to customize visualizations of the compound presentation via the display 134 and/or make any modifications to the employer's job listing (or multiple job listings) based on the role improvement recommendation generated by the recommendation generator 128 of the market fit compute device 110.

In some implementations, the dashboard generator 130 can be caused (executed, activated) by the processor 112 to generate a user evaluation for the user U based on the matching score for the user U and the fit score for the user U. The user evaluation can be displayed on the display 134 of the management device 132 as part of the compound presentation. The user evaluation can be or include a computer-generated assessment of the user U indicating a likelihood that the user U is to match with the job listing provided by the employer operating the management device 132, based on the job market.

Figure 2:
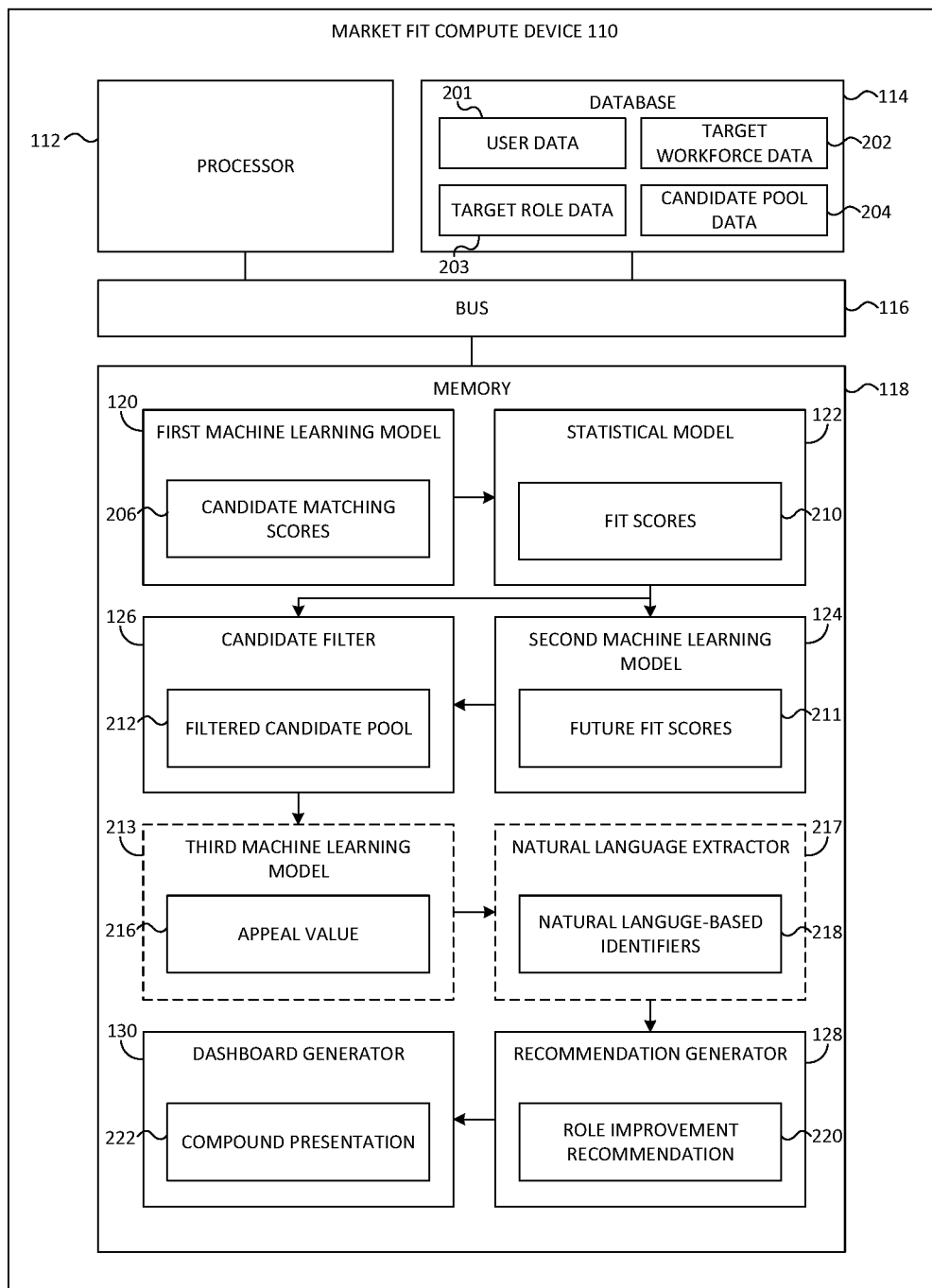
FIG. 2 is a block diagram of a market fit compute device and its processes for evaluating candidates and refining job listings using machine learning based on fit scores, according to an embodiment.

FIG. 2 is a block diagram of a market fit compute device 110 and its processes for evaluating candidates C and refining job listings using machine learning based on fit scores, according to an embodiment. The memory 118 can store instructions to cause the processor 112 to receive, from a user compute device (not shown in FIG. 2), user data 201. The memory 118 can also store instructions to cause the processor 112 to receive candidate pool data 204. The candidate pool data 204 can be retrieved from other online platforms associated with candidates C and employment, and/or the like. The candidate pool data 204 can also be retrieved from other candidates who have previously provided their information to the market fit compute device 110. The memory 118 can also store instructions to cause the processor 112 to receive target workforce data 202. The target workforce data 202 can be retrieved from a publicly-available source such as, for example, the Internet. In some cases, the processor 112 can store the target workforce data 202 in the database 114 and update it with new data associated with the target workforce data 202, to create a robust database, without relying on publicly-available sources. The memory 118 can also store instructions to cause the processor to receive target role data 203 from a management device (not shown in FIG. 2) operated by an employer. The processor 112 can further be caused to store all incoming and/or outgoing data (e.g., the user data 201, the target workforce data 202, the target role data 203, and/or the candidate pool data 204) in the database 114.

The target role data 203 can include, for example, information describing a job listing (also referred to as a "target role") provided by the employer operating the management device. The information can include, for example, job title, job description, job responsibilities, job location, company size, salary, minimum required skills and experience, preferred skills and experience, employer benefits, and/or the like. For example, the employer can provide a target role or multiple target roles to the market fit compute device 110 to receive, from the market fit compute device 110, how competitive the specific job listing or multiple job listings is compared to other job listings in the same market, a list of candidates that best match with the employer's target role or multiple target roles, and recommendations on how to improve that target role or multiple target roles to attract top candidates.

The target workforce data 202 can include, for example, information describing a specific market and/or workforce. For instance, the target workforce data 202 can include information describing job demand of a specific market, number of employees within the specific market, influx/outflux of employees entering/exiting the specific market, job turnover rate, number of employees across various seniority levels, future outlook of the specific market, and/or the like. The target workforce data 202 can also include the candidate pool data 204. In some implementations, the memory 118 can store instructions to further cause the processor 112 to process and/or segment the target workforce data 202 based on demographic data, to narrow the specific market defined by the target workforce data 202. The target workforce data 202 can also include a role pool containing multiple roles and/or jobs associated with the specific market defined by the target workforce data 202. The role pool can include a pool of roles and/or jobs similar to the job listing provided by the employer and defined by the target role data 203. For example, the target role defined by the target role data 203 provided by the employer can be, for example, software engineer. The role pool can include similar jobs and/or roles such as, for example, software engineer, engineer, solutions architect, back-end developer, front-end developer, cloud architect, quality engineer, test engineer, machine learning engineer, full-stack developer, and/or the like. The role pool can include role data for each job and/or role in the role pool. The role data can include information describing jobs associated with the specific market defined by the target workforce data 202. For example, the specific market can be cybersecurity with jobs including, for example, cybersecurity analyst, cybersecurity consultant, cybersecurity solutions architect, and/or the like. The role data can include information describing each job within the specific market such, as for example, job responsibilities, required experience level, job location, required skills, required education, and/or the like.

In some implementations, the processor 112 of the market fit compute device 110 can retrieve the target workforce data 202 based on a job market associated with the target role data 203 of the employer. For instance, if the employer provide the target role data 203 containing a target role in an industry such as, for example, consulting, the processor 112 of the market fit compute device 110 can retrieve job market information related to the consulting industry. As such, the processor 112 can also retrieve other similar jobs and/or roles in the consulting industry from other employers.

The candidate pool data 204 can be associated with target workforce data 202. The candidate pool data 204 can include information describing a group of candidates C associated with a job market associated with the target workforce data 202. In some cases, the candidate pool data 204 can be a subset of data from the target workforce data 202 that describes general information about candidates C within the job market associated with the target workforce data 202. The candidate pool data 204 can include, for example, information about the various number of candidates C within the job market defined by the target workforce data 202 and/or the like.

The candidate pool data 204 can include multiple candidate data associated with each candidate from the group of candidates C defined by the candidate pool data 204. For instance, the candidate data can include job related information for a candidate, such as, for example, job title, job responsibilities, experience level, previous employers, location, industry, field in the industry, education, and/or the like. The candidate data can also include demographic information about each candidate, such as, for example, gender, age, ethnicity, and/or the like. In some implementations, the candidate data can be manually inputted information by the candidate and/or be contained in a document and/or document image of a resume provided by the candidate (also referred to as "resume document image"). The resume document image can be processed by the processor 112 from the user data 201 and/or the candidate data from the candidate pool data 204.

The user data 201 can include job related information and/or demographic related information describing the user U, where the user U can be a candidate of interest (i.e., a specific candidate that is being compared to with a larger group of candidates). The user data 201 can include similar information to that of the candidate data. In some cases, the user data 201 can be part of the candidate pool data 204.

After the processor 112 receives the user data 201 associated with the user U, the target workforce data 202, target role data 203 associated the target workforce data 202, and candidate pool data 204 associated with the target workforce data 202, the memory 118 can store instructions to cause the processor 112 to store the retrieved data in the database 114.

The memory 118 can store instructions to further cause the processor 112 to randomly select a group of candidates from the candidate pool data 204. Each candidate from the candidate pool data 204 can be associated with role data from a role pool from the target workforce data 202. For instance, the candidate pool data 204 can include a plethora of candidates and their associated candidate data. Processing a plethora of candidate data can be time and energy consuming. The memory 118 can store instructions to further cause the processor 112 to randomly select the plurality of candidates from the candidate pool data 204 associated with multiple role data from the role pool. The role data can include a set of role features including information about a role and/or any role in the job market defined by the target workforce data 202 such as, for example, salary, job location, job benefits, job responsibilities, remote work availability, and/or the like. The selection of random candidates can be based on role data having role features shared with the target role data 203. For example, roles that are similar and have similar job responsibilities, job requirements, and/or the like.

The processor 112 of the market fit compute device 110 can randomly select a subset of candidates to reduce computational overhead. In some cases, the processor 112 can randomly select a different number of candidates based on the candidate pool data 204 and/or the target workforce data 202. In some cases, the processor 112 can randomly select a pre-defined number of candidates to form the group of candidates. In some cases, the processor 112 can receive an input from the employer operating the management device, indicating a specific number of candidates to be randomly-selected.

The memory 118 can store instructions to further cause the processor 112 to execute a first machine learning model 120, a user matching score for the user U based on a comparison between the user data 201 and the target role data 203. The first machine learning model 120 can include any machine learning model, neural network, tree-based model, and/or the like. The first machine learning model 120 can include (or be) a supervised machine learning model or an unsupervised machine learning model. The user matching score can also be generated based on information about job listing(s) to which the user U applied and/or applies. In some cases, the user U can have multiple user matching scores for multiple job listings from multiple employers, where each matching score can be different based on each job listing and each employer of that job listing. In some implementations, the user matching score can include a score indicating level of matching and/or similarities between the user U and a job and/or role, similar and/or identical to the target role provided by the employer. The job and/or role used to generate the user matching score can be retrieved, for example, from any talent-to-job matching machine learning model and/or artificial intelligence model from an open source. In some cases, the job and/or role used to generate the user matching score can be retrieved, for example, from an application of the user and/or an application history of the user (e.g., resume, previous versions of the resume, job applications applied using the resume or previous versions of the resume, etc.). In some implementations, the user matching scores can include (or be) an average and/or median of user matching scores between the user U and other jobs and/or roles of other employers sharing a same job category (e.g., industry, title, field, etc.) to which the user U has also applied or indicated interest. In some implementations, the first machine learning model 120 can also generate multiple user matching scores for the user U based on other roles for other employers. The processor 112 can execute the first machine learning model 120 using the user data 201, the target workforce data 202, the target role data 203, and/or the candidate pool data 204 as inputs to generate user matching scores.

In some cases, the user matching score can be generated based on an average, a median, a percentile, or a minimum/maximum of multiple role scores from multiple user U roles from the role pool to which the user U has applied (i.e., previously applied roles by the user U at the employer and/or other employers). In some implementations, the memory 118 can store instructions to cause the processor 112 to generate and/or calculate role scores for role data (e.g., roles including the target role) from multiple employers and/or management devices. A role score for role data (e.g., a job and/or job listing) can be a numerical value in a numerical range that indicates how competitive a role is compared to other roles in the same job market. The role score can also be generated based on level of job title and/or experience. For instance, an entry level role can have a role score lower than a senior level role. The role score can also be generated based on the role data including information such as, for example, salary, job location, job benefits, job responsibilities, remote work availability, and/or the like. A role score for an entry level role having a higher salary than another entry level role can have a higher role score. The role score can also be generated based on completeness and descriptiveness of the role. For instance, roles with missing information or incomplete sentences and/or phrases can have lower role scores than roles with detailed information. The user U role can include any roles that the user U has previously applied to and/or any previously employed positions. The processor 112 can generate role scores for the user U roles and use the role scores to generate the user matching score. The processor 112 can use the role scores to determine how attractive the roles are compared to the candidates and/or how competitive each role is compared to other roles.

The memory 118 can store instructions to further cause the processor 112 to execute, the first machine learning model 120 to generate a candidate matching score 206 and/or a set of candidate matching scores 206 for each candidate from the group of randomly-selected candidates, based on a comparison between the candidate data from the multiple candidate data from the candidate pool data 204 and the role data from the role pool. Each candidate data can be associated with each candidate from the randomly-selected group of candidates. The candidate data can be similar and/or include similar data to that of the user data 201. Each of the candidate matching scores 206 can be generated similarly to generating the user matching score. In some cases, the user matching score can be analogous to the candidate matching score 20. In some cases, the user U can represent a specific candidate of interest that the processor 112 can compare other candidates C to.

In some implementations, the memory 118 can store instructions to cause the processor 112 to train the first machine learning model 120 using training data, to produce a trained first machine learning model. The training data used to train the first machine learning model 120 can include a candidate pool training set. The candidate pool training set can include candidate raw data correlated to a role compatibility score. The candidate raw data can include pre-processed candidate data. For example, the candidate raw data can include any inputted information by a candidate such as, for example, skills, education, interests, experience, and/or the like. In some implementations, the candidate raw data can also include extracted natural language-based characters from a document and/or document image of the candidate's resume. The role compatibility score can include a score indicating matches between the candidate raw data and role data (e.g., roles from multiple employers and/or previous/older roles) that share common features, such as for example, salary preference, experience level, job title, job requirements, and/or the like.

In a training phase of the first machine learning model 120, the first machine learning model 120 can receive the candidate pool training set and optimize (or improve) a set of model parameters of the first machine learning model 120. The set of model parameters can be optimized (or improved) such that the raw candidate data in the training data can be annotated and/or classified correctly with a certain likelihood of correctness (e.g., a pre-defined likelihood of correctness) to be correlated to a compatibility score for the raw candidate data to the role data. The candidate pool training set can also include a set of resume document images and/or a set of representations of annotations of candidate features from the raw candidate data. Each representation of annotations of candidate features can be associated and/or correlated to a compatibility score of each representation of annotations of candidate features to an associated role feature of each role data. For instance, the candidate features of the raw candidate data can include natural language-based characters describing the raw candidate data such as, for example, skills, experience level, education, and/or the like. The role features of the role data can include natural language-based characters describing the role data such as, for example, required skills, required education, required experience level, and/or the like. The experience level from the raw candidate data can be correlated to the required experience level from the role data, the education from the raw candidate data can be correlated to the required education from the role data, the skills from the raw candidate data can be correlated to the required skills from the role data, and so forth. In some implementations, the first machine learning model 120 can be executed in parallel while being trained and generate matching scores (including the candidate matching scores 206 and the user matching score). The trained first machine learning model can be further trained and/or executed using the candidate pool training set that can be further optimized to produce a robust machine learning model.

The memory 118 can store instructions to further cause the processor 112 to produce a matching score distribution that is associated with the target workforce data 202, based on the candidate matching scores 206 user matching score. In some cases, the matching score distribution can include a normal distribution (or any type of distribution) of all matching scores, including the candidate matching scores 206 user matching score. The matching score distribution can be associated with the job market defined by the target workforce data 202.

The memory 118 can store instructions to further cause the processor 112 to execute the statistical model 122 to generate a fit score for the user U based on a number of candidates in a subset of candidates from the group of (randomly-selected) candidates. The memory 118 can store instructions to cause the processor 112 to execute the statistical model 122 to generate multiple fit scores 210 (also referred to as "fit scores") for the group of randomly-selected candidates. The fit scores 210 can include the fit score for the user U and each candidate from the group of randomly-selected candidates. The processor 112 can be caused to generate and/or calculate, via the statistical model 122, a fit score using the following formula:

$$\frac{\text{number of candidates having a candidate matching score lower than } S}{\text{number of total candidates in the subset of candidates}} \times 100$$

where S is the matching score of one candidate from the randomly-selected group of candidates, such as, for example, the user U (i.e., the user matching score) or the candidate matching score 206 of the candidate of interest. In some implementations, the formula described above can be implemented in the statistical model 122. The fit score can include (or be), for example, a numerical range from 0 to 100 and indicate how strong the user U (or candidate) is compared to other similar candidates in the same job market defined by the target workforce data 202. For example, the statistical model 122 can produce a fit score of 80 for the user U based on the user matching score and/or the matching score distribution. The fit score of 80 means that the user U is ranked higher than 80% of the fit scores 210 for the other candidates from the randomly-selected group of candidates in the same job market. In some cases, the fit score can indicate percentile rank of the candidate having a matching score of S in the matching score distribution.

In some implementations, the statistical model 122 can be or include any machine learning model or neural network as described herein. For instance, the statistical model 122 can include a set of model parameters such as weights, biases, or activation functions that can be executed to annotate and/or classify matching scores (e.g., the user matching score and the candidate matching scores 206) paragraphs of a resume document image or a set of resume document images. The statistical model 106 can be executed during an execution phase.

In some implementations, the statistical model 122 can generate the fit scores 210 using the formula that can be used to train the second machine learning model 124. The second machine learning model 124 can receive training data and optimize (or improve) the set of model parameters of the second machine learning 124. The set of model parameters are optimized (or improved) such that candidates are classified correctly with a certain likelihood of correctness (e.g., a pre-defined likelihood of correctness) to the actual fit scores of those candidates. The second machine learning model 124 can be configured to, when executed by the processor 112, to automatically generate the future fit scores 211 without sampling candidates C from the candidate pool data 204. The future fit scores 211 can include fit scores for other candidates from the candidate pool data 204 (or new candidates). In some implementations, the second machine learning model 124 can be used to generate fit scores (e.g., future fit scores 211) instead of the statistical model 122. This is so, at least in part to generate fit scores (e.g., fit scores 210 and/or future fit scores 211) without re-sampling candidates and updating the matching score distribution.

In some implementations, the second machine learning model 124 can generate and/or calculate multiple future fit scores 211 for a candidate (or multiple candidates) and perform an average, a median, a percentile, or the like, to determine a final fit score to be associated with that candidate. This is so, at least in part, to further randomize the candidates in the candidate pool data 204 to increase accuracy of the fit score. For instance, a single subset of candidates from the randomly-selected group of candidates used to generate and/or calculate the fit score of the user candidate can be insignificant. The processor 112 can perform the same operation multiple times to improve the accuracy of the fit score based on the randomization of candidates (including a randomization of the subset of candidates that may have candidate matching scores lower than the user matching score). The same operations can be applied to each candidate from the randomly-selected group of candidates.

In some implementations, the second machine learning model 124 can generate/predict future fit scores 211 of candidates (e.g., new candidates, different candidates, same candidates, etc.) from the candidate pool data 204 without sampling the candidate pool data 204 and/or without using the same formula described previously. In some implementations, the second machine learning model 124 can be further trained using training data that includes previously generated fit scores of candidates, candidate information (e.g., resume, job title, work experience, education, etc.), information about job listings (e.g., location, required skills, qualifications, benefits, etc.), information about the specific market (e.g., number of candidates in the specific market, influx/outflux of candidates in the specific market, etc.). In some cases, the training data can be labeled using the fit scores 210 as the label. The training data can be used to train the second machine learning model 124 to predict fit scores (e.g., future fit scores 211) without using matching scores of candidates (which were used to generate fit scores via the statistical model 122).

The memory 118 can store instructions to further cause the processor 112 to filter, via the candidate filter 126, the group randomly-selected candidates associated with the target workforce data 202 based on the fit scores 210 and a fit score threshold, to produce a filtered candidate pool 212. The candidate filter 126 can include any software and/or hardware module configured to filter a number of candidates recorded by the processor 112 based on the fit scores 210 and/or the fit score threshold. The filtered candidate pool 212 can include a filtered subset of candidates from the group of randomly-selected candidates. The fit score threshold can include a minimum and/or maximum value that a fit score of a candidate meets to be included in the filtered candidate pool 212. For instance, the employer can input a signal indicating that the fit score threshold to be 90, enabling the processor 112 of the market fit compute device 110 to filter the group of randomly-selected candidates (including the user U) that have candidate matching scores 206 of 90 or above. If the user matching score is 90 or above, the user U will be filtered to be included in the filtered candidate pool 212. If the user matching score is below 90, the user U will not be included in the filtered candidate pool 212. In some implementations, the candidate filter 126 can be configured to receive future fit scores 211 from the second machine learning model 124 instead of receiving fit sores 210 generated by the statistical model 122.

In some implementations, the memory 118 can store instructions to further cause the processor 112 to filter the group of randomly-selected candidates based on a set of fit tiers. The set of fit tiers can include a number of tiers defined by the fit scores 210 of the candidates (including the user U). The fit tiers can be organized, for example, in increments of 10 for the fit scores 210. In some cases, the fit tiers can be organized based on fit scores associated with skill level and/or experience level. For instance, candidates with greater skills and experience can be associated with higher fit scores. As such, fit tiers can be organized into, for example, entry level for the fit scores 210 between 0 and 60, senior level for the fit scores 210 between 61 and 80, and expert level for the fit scores 210 between 81 and 100. The processor 112 can be caused, by an input by the employer, to filter candidates from the group of randomly-selected candidates (including the user U) based on fit tiers.

The memory 118 can store instructions to further cause the processor 112 to classify the user U and the candidates from the randomly-selected group of candidates in a fit tier from the set of fit tiers based on the fit score of the user U and the fit score of each candidate from the group of randomly-selected candidates. The memory 118 can store instructions to further cause the processor 112 to rank each candidate from the group of randomly-selected candidates (including the user U) based on the fit scores 210 (including the fit score of the user U).

In some implementations, the memory 118 can store instructions to further cause the processor 112 to parse the candidate pool data 204 (including each candidate data for each candidate in the job market defined by the target workforce data 202), to identify a set of common features among the candidates classified in each fit tier from the set of fit tiers, to enhance the classification of future candidates.

The memory 118 stores instructions to further cause the processor 112 to generate, an appeal value 216 for the target role data 203 based on a comparison of (1) the multiple role data from a role pool from the target workforce data 202 associated with the filtered subset of candidates from the filtered candidate pool 212 and (2) the target role data 203. In some implementations, the memory 118 can include an optional third machine learning model 213 to generate the appeal value 216. In some implementations, the third machine learning model 213 can include any machine learning model, neural network, tree-based model, and/or the like. The third machine learning model 213 can be a supervised machine learning model and/or an unsupervised machine learning model. The appeal value 216 can include a numerical score and/or value indicating an attractiveness level for the target role data 203 (e.g., job listing provided by the employer) to candidates, including candidates with high fit scores. The appeal value 216 can also be generated based on market trends. For instance, the target role data 203 can include natural language-based identifiers 218 (extracted by a natural language extractor 217) such as, for example, "remote" that appeals to a majority of candidates. The natural language-based identifiers 218 can also include, for example, "free parking," "catered meals," "20 days paid time off," "maternal/paternal leave assistance," "H1-B visa sponsorship," and/or any perk, that appeals to a majority of candidates. In some cases, some job listings can contain natural language-based identifiers 218 that describe perks that higher quality job listings do not have, resulting in the job listings that describe those perks having higher appeal values than the higher quality job listings that do not have those perks. For example, a highly regarded employer can have an executive level job listing that has engagement with candidates C having high fit scores 210 such as, for example, 99. That job listing, however, may have substantially fewer engagements from a majority of candidates C compared to an entry level job listing at smaller and/or lesser regarded employers, which appeals to a larger number of candidates than the executive level position. In some cases, multiple job listings can be substantially the same (e.g., same position, same level of experience, same responsibilities, same requirements, etc.), but the job listings with better perks can have higher engagement with candidates C, thus resulting in higher appeal values. The processor 112 can track traffic of candidates viewing and/or showing interest for job listings and/or roles and common features (e.g., natural language-based identifiers) they share.

In some implementations, the appeal value 216 for the target role data 203 can be generated in response to an execution of an optional third machine learning model 213. The third machine learning model 213 can be or include any machine learning model and/or neural network as described herein. Instead of comparing the multiple role data from the role pool from the target workforce data 202 to the target role data 203, the third machine learning model 213 can be trained to produce a trained third machine learning model and to identify and/or classify job listings defined by the role data (including the job listing defined by the target role data 203).

In a training phase of the third machine learning model 213, the third machine learning model 213 can receive training data such as, for example, an appeal training set, and optimize (or improve) a set of parameters of the third machine learning model 213 that can be optimized (or improved) such that job listings as defined by the role data can be annotated and/or classified correctly to an a candidate engagement score with a certain likelihood of correctness (e.g., a pre-defined likelihood of correctness). The appeal training set can include, for example, natural language-based features from role data correlated to a candidate engagement score. The natural language-based features can include any natural language-based words found in the role data (e.g., perks of job listings). The candidate engagement score can include a numerical score indicating level of traffic and/or engagement, based on number of clicks, views, show of interest, and/or the like, for job listings that contain the natural language-based features. The trained third machine learning model can be further trained and/or executed by the processor to optimize (or improve) predictions of appeal values for role data.

In some implementations, the memory 118 can optionally include a natural language extractor 217. In some implementations, the natural language extractor 217 can be or include a machine learning model that, when executed by the processor 112, identifies and/or extracts natural language-based identifiers (e.g., text, words, characters, phrases, numbers, etc.) from information about the user U, candidates C, and/or the job listing provided by the employer. In some cases, the natural language extractor 217 can receive document images containing such information to be parsed and/or identify notable keywords and/or phrases. For instance, the notable keywords and/or phrases can include common keywords and/or phrases shared among multiple job listings that display high engagement with candidates. The natural language extractor 217 can be or include any machine learning model, tree-based model, neural network, and/or the like. In some implementations, the natural language extractor 217 can be or include any machine learning model and/or neural network as described herein.

In some implementations, the natural language extractor 217 can be configured to extract, natural language-based identifiers 218 from multiple role data (e.g., job listings) from the target workforce data 202. In some implementations, the memory 118 can store instructions to cause the processor 112 to execute the natural language extractor 128 to extract natural language-based identifiers 218 from role data having higher appeal values than the appeal value 216 for the target role data 203. The natural language-based identifiers 218 can be or include, for example, any natural language-based characters, words, text, phrases, paragraphs, numbers, and/or the like, describing information of any role data (i.e., contents of job listings). The processor 112 can extract and/or identify, via the natural language extractor 217, natural language-based identifiers 218 shared by multiple role data (e.g., multiple job listings) that have higher appeal values than the appeal value 216 of the target role data 203. This is so, at least in part, for the processor 112 to determine any lacking features that the target role data 203 may have compared to role data having higher appeal values 216.

For instance, the target role data 203 can include perks such as fifteen annual vacation days. Other role data, however, can have natural language-based identifiers 218 describing perks including, for example, twenty annual vacation days. The processor 112 can identify natural language-based identifiers 218 and/or patterns indicating high engagement from candidates based on such natural language-based identifiers 218. In another example, the target role data 203 can be or include a job listing for software engineer. Other role data can be or include job listings of software engineers can display higher engagement from candidates than that of the target role data 203, despite offering the same (or substantially similar) job listing. The other role data can include, for example, a perk of remote work which can be identified and/or extracted by the natural language extractor 216, which can be a cause to the other role data having higher engagement from candidates C, thus having higher appeal values 216.

In some implementations, the natural language extractor 217 can be or include at least one of a machine learning model, neural network, and/or the like. In some implementations, the memory 118 can store instructions to cause the processor 112 to train the natural language extractor 217, to produce a trained natural language extractor. The trained natural language extractor can be further trained and/or executed by the processor 112 to efficiently and/or accurately identify relevant natural language-based identifiers 218 from multiple role data. For instance, the natural language extractor 217 can include a set of model parameters such as weights, biases, or activation functions that can be executed to annotate and/or classify segments of a job listing defined by role data. In some instances, the set of model parameters can also be executed to annotate and/or classify relevant topics, words, and/or preferences inputted by candidates C when filtering job listings. The natural language extractor 217 can be executed during a training phase and/or an execution.

In the training phase of the natural language extractor 217, the natural language-based extractor 217 can receive training data that optimizes (or improves) the set of model parameters of the natural language extractor 217. The set of model parameters are optimized (or improved) such that segments of role data and/or segments of search filters in the training data can be annotated and/or classified correctly with a certain likelihood of correctness (e.g., a pre-defined likelihood of correctness) to identify natural language-based identifiers 218 with high engagement. In other words, the natural language extractor 217 can be trained to scan relevant words in search filters inputted by candidates C, identify role data with high engagement, identify common natural language-based identifiers 218 shared among high engagement role data, and/or the like.

The memory 118 can store instructions to further cause the processor 112 to generate a role improvement recommendation 220 based on the natural language-based identifiers 218 extracted from the multiple role data and/or the fit scores 210. In some implementations, the memory 118 can store instructions to cause the processor 112 to execute the recommendation generator 128, to generate the role improvement recommendation 220. The role improvement recommendation 220 can be configured, when executed by the employer of the management device, to increase the appeal value 216 for the target role data. The role improvement recommendation 220 can be configured to improve the target role data 203 provided by the employer to better attract candidates (including the user U) with higher fit scores 210 by, for example, broadcasting jobs in multiple job boards, clarifying job responsibilities, modifying job listings to be remote friendly, and/or the like. The role improvement recommendation 220 can include a suggestion(s) and/or instructions to improve the attractiveness of the target role data 203. In some implementations, the database 114 can store a set of role improvement recommendations for various scenarios that the processor 112 can use to generate the role improvement recommendation 220.

The recommendation generator 128 can be or include a software program and/or routine used to generate, when executed by the processor 112, the role improvement recommendation 220 to enable the employer to modify and/or update the target role data 203 provided by the employer (or any role data provided by any employer). For example, the role improvement recommendation 220 can be configured to, when executed, to embed extracted common natural language-based identifiers 218, via the natural language extractor 217, associated with high candidate engagement into the target role data 203. In some cases, the role improvement recommendation 220 can be configured to remove words and/or phrases in the target role data 203 associated with low candidate engagement.

In some implementations, the memory 118 can store instructions to further cause the processor 112 to generate the role improvement recommendation 220 for the target role data 203 based on fit scores 210 of the filtered candidate pool 212 and the natural language-based identifiers 218. The role improvement recommendation 220 can be configured, when executed by the employer, to refine the target role data 203, to produce an updated target role data. In some implementations, the processor 112 can be configured to, based on the role improvement recommendation 220, to embed natural language-based identifiers 218 (e.g., natural language-based identifiers 218 shared among role data having high appeal values and/or high engagement with candidate C) into the target role data 203, to potentially appeal to more candidates C. In some implementations, the role improvement recommendation 220 can be executed, based on an input from the employer, by the processor 112 to make any modifications and/or updates to the target role data 203 automatically.

In some implementations, the recommendation generator 128 can be or include at least one of any machine learning model, neural network, and/or the like. The memory 118 can store instructions to further cause the processor 112 to train the recommendation generator 128, to produce a trained recommendation generator using training data such as, for example, a recommendation training set. The recommendation generator 128 can include a set of model parameters such as weights, biases, or activation functions that can be executed to annotate and/or classify role data.

In a training phase of the recommendation generator 128, the recommendation generator 128 can receive the recommendation training set that optimizes (or improves) the set of model parameters of the recommendation generator 128. The recommendation training set can include, for example, role features correlated to an improvement response. The role feature in the recommendation training set can include data describing roles such as, for example, natural language-based identifiers, characters, words, and/or the like, describing the contents of the role data. The improvement response can include an improvement recommendation for individual role features extracted in role data. In some cases, the role improvement recommendation 220 can include a set of improvement recommendations for each role feature in the target role data 203. The set of model parameters are optimized (or improved) such that segments of role features in the training data can be annotated and/or classified correctly with a certain likelihood of correctness (e.g., a pre-defined likelihood of correctness). The trained recommendation generator can be further trained and/or executed by the processor 112 to predict role improvement recommendations 220 more efficiently and/or accurately.

In some instances, the training data can be divided into batches of data based on a memory size, a memory type, a processor type, and/or the like. In some instances, any candidate data (including user data) and any role data (including target role data 203) can be divided into batches of data based on a type of the processor 104 (e.g., CPU, GPU, and/or the like), number of cores of the processor 104, and/or other characteristic of the memory 102 or the processor 104.

In some instances, the training data can be divided into various training sets, a test set, and/or a validation set. For example, the training data can be randomly divided so that 60% of the training data is in the training set, 20% of the training data is in the test set, and 20% of the training data is in the validation set. Any machine learning model as described herein can be iteratively optimized (or improved) based on the training data (and/or each machine learning model's respective training set) while being tested on the test set to avoid overfitting and/or underfitting of the training data. Once each machine learning model is trained based on the training sets and the test set, a performance of each machine learning model can be further verified based on the validation set. Because the execution phases of each machine learning model is performed using each of their set model parameters that were already optimized during their respective training phases, the execution phases are computationally quick.

In some implementations, the memory 118 can store instructions to further cause the processor 112 to predict and/or identify a match between the target role data 203 and the fit score threshold, based on the target role data 203 or a group of candidates (from the candidate pool data 204) associated with the target role data 203. The group of candidates C can include multiple candidates C who have applied and/or shown interest to the job listing defined by the target role data 203 provided by employer. The match can indicate, for example, a match/identification between the candidates from the group of randomly-selected candidates C (including the user U) to the target role data 203, based on the fit score threshold. In some cases, the processor 112 can be caused to identify, candidates that best match with the employer's job listing defined in the target role data 203, even if one or more candidates do not have fit scores above the fit score threshold.

In some implementations, the memory 118 can store instructions to further cause the processor 112 to generate a role fit score from a set of role fit scores for each role data from the role pool, based on a group of candidates C from the candidate pool data 204 associated with each role data from the role pool. The role fit score can be generated similarly to generating the fit scores for the candidates. The role fit score can include a numerical range from 0 to 100 indicating how competitive a role defined by the role data is compared to market trends and/or the job market defined by the target role data 203. Role data with role fit scores identical to fit scores of candidates C can indicate that a target role match is found. In some implementations, the statistical model 122 can be configured, via the processor 112, to generate the role fit scores. The role fit scores can be generated similarly to generating the fit scores.

In some implementations, the memory 118 can store instructions to further cause the processor 112 to update the role fit score of the target role data 203 based on an execution of the role improvement recommendation 220. If the employer modifies the target role data 203 based on the role improvement recommendation 220, the statistical model 122 can be executed, via the processor 112 to update the role fit score of the target role data 203.

The memory 118 can also store instructions to further cause the processor 112 to generate a compound presentation 222, to be displayed on the management device. The compound presentation 222 can display a variety of candidate information including, for example, fit scores 210, candidate matching scores 206, candidate data, and/or the like. The compound presentation 222 can include (or be), for example, a graphical user U interface (GUI) with which the person (e.g., employer) operating the management device can interact. The compound presentation 222 can also display the role improvement recommendation 220, fit scores 210, appeal values, and/or the like. In some implementations, the compound presentation 22 can be generated by the dashboard generator 130.

Alternatively or additionally, the compound presentation 222 can also be displayed on the user compute device operated by the user U and/or any compute devices operated by candidates C. The user U can view statistics regarding the job market defined by the target workforce data 202, the candidate pool data 204, the user data 201, the target role data 203, and/or the like. Fit scores 210 can be shown to candidates C so they can see how they fair against other candidates C.

Figure 3:
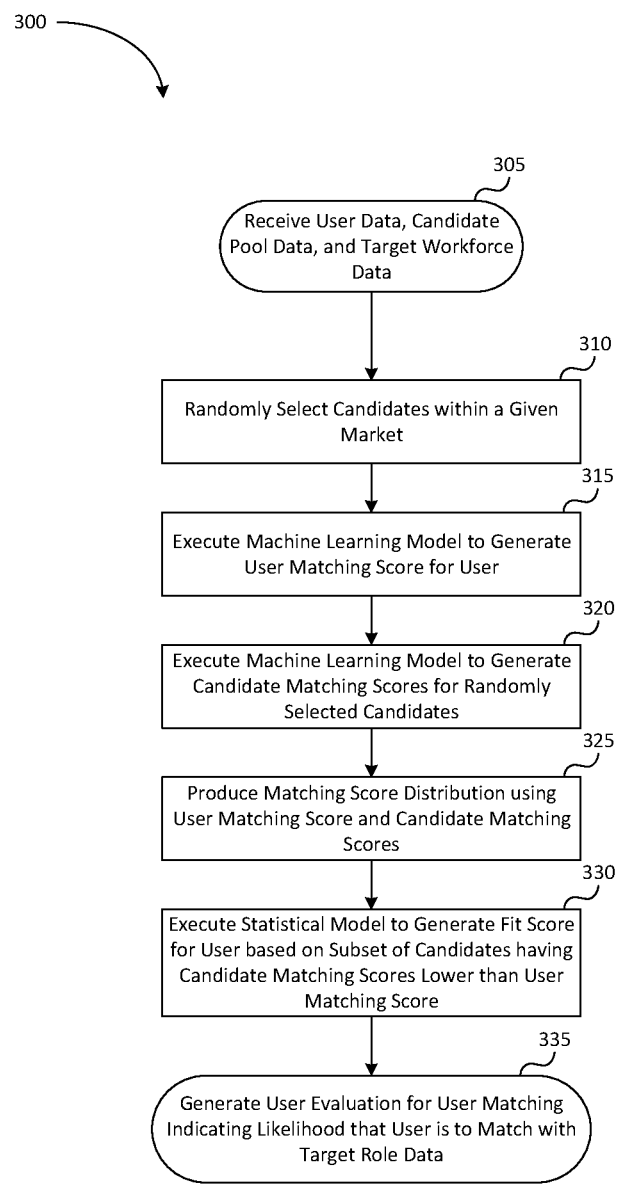
FIG. 3 is a flow diagram of a method for evaluating a candidate using machine learning based on a fit score, according to an embodiment.

FIG. 3 is a flow diagram of a method 300 for evaluating a candidate using machine learning based on a fit score, according to an embodiment. At 305, the method 300 can include receiving, at a processor of a market fit compute device, user data, candidate pool data, and target workforce data. The user data can include job related information for a user, such as, for example, job title, job responsibilities, experience level, previous employers, location, industry, field in the industry, education, and/or the like. The user data can also include demographic information about each candidate, such as, for example, gender, age, ethnicity, and/or the like. The candidate pool data can include information about a group of candidates within a job market defined by the target workforce data. The candidate pool data can include candidate data for each candidate, where the candidate data can be similar to the user data. The candidate data can include job related information for a candidate, such as, for example, job title, job responsibilities, experience level, previous employers, location, industry, field in the industry, education, and/or the like. The user data can also include demographic information about each candidate, such as, for example, gender, age, ethnicity, and/or the like.

At 310, the method 300 includes randomly selecting, via the processor, a group of candidates from the candidate pool data, each candidate from the group of randomly-selected candidates associated with role data from a role pool from the target workforce data. The randomly-selected group of candidates can be associated with the same job market as the user. The candidates can share similar information such as, for example, job title, experience, job responsibilities, education, and/or the like. The method 300 can include randomly selecting a fixed number of candidates.

At 315, the method 300 includes executing, via the processor, a machine learning model to generate a user matching score for the user. The machine learning model can be or include any machine learning model as described herein.

At 320, the method 300 includes executing, via the processor, the machine learning model multiple candidate matching scores for the group of randomly-selected candidates. The method 300 can include generating the candidate matching scores using the machine learning model.

At 325, the method 300 includes producing a matching score distribution using the user matching score and the candidate matching scores. In some cases, the matching score distribution can include a normal distribution of all matching scores, including the user matching score and the candidate matching scores. The matching score distribution can be associated with the job market defined by the target workforce data.

At 330, the method includes executing a statistical model to generate the fit score for the user based on a subset of candidates having candidate matching scores lower than the user matching score. The fit score of the user U can be generated and/or calculated via the statistical model using the following formula:

$$\frac{\text{number of candidates having a candidate matching score lower than } S}{\text{number of total candidates in the subset of candidates}}$$

where S is the user matching score (or the candidate matching score of the candidate of interest). The fit score can include (or be), for example, a numerical range from 0 to 100 and indicates how strong the user (or candidate) is to other similar candidates in the same job market defined by the target workforce data. For example, the statistical model can produce a fit score of 80 for the user based on the user matching score and/or the matching score distribution. The fit score of 80 means that the user is ranked higher than 80% of other candidates from the randomly-selected group of candidates in the same job market.

At 335, the method 300 includes generating a user evaluation for the user based on the user matching score and the fit score for the user. The user evaluation can indicate a likelihood that the user is to match with the target role data based on the target workforce data. For instance, the fit score of the user can include a score based on market trends compared to a randomly-selected group of candidates within a specific market specified by the target workforce data, which in turn, can be indicative of how competitive the user is in the specific market defined by the target workforce data.

Figure 4:
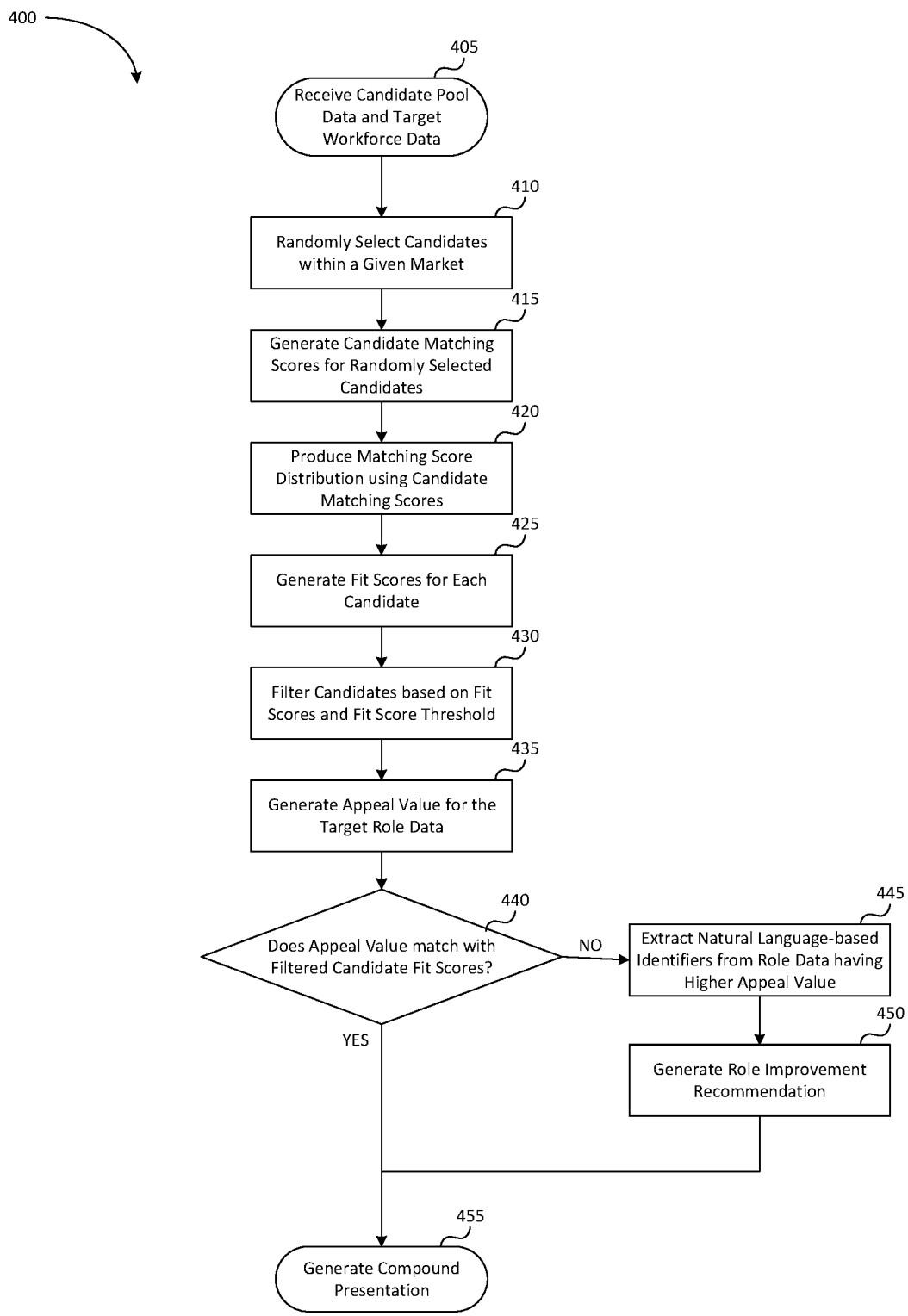
FIG. 4 is flow diagram of a method for evaluating candidates and refining job listings using machine learning based on fit scores, according to an embodiment.

FIG. 4 is flow diagram of a method 400 for evaluating candidates and refining job listings using machine learning based on fit scores, according to an embodiment. At 405, the method 400 includes receiving, via a processor, candidate pool data and target workforce data. The candidate pool data can include multiple candidate data for multiple candidates associated with a job market defined by the target workforce data. The candidate pool data can also be associated with the target workforce data.

At 410, the method 400 includes randomly selecting, via the processor, a group of candidates from the candidate pool data, each candidate from the group of randomly-selected candidates associated with role data from a role pool from the target workforce data. The randomly-selected group of candidates can be associated with the same job market as the user. The candidates can share similar information such as, for example, job title, experience, job responsibilities, education, and/or the like. The method 400 can include randomly selecting a fixed number of candidates.

At 415, the method 400 includes generating, via an execution of a machine learning model by the processor, multiple candidate matching scores for the group of randomly-selected candidates. The machine learning model can be or include any machine learning model as described herein.

At 420, the method 400 includes producing a matching score distribution using the user matching score and the candidate matching scores. In some cases, the matching score distribution can include a normal distribution of all matching scores, including the user matching score and the candidate matching scores. The matching score distribution can be associated with the job market defined by the target workforce data.

At 425, the method includes generating, via an execution of a statistical model by the processor, a fit score each candidate based on the candidate matching scores. The fit score of a candidate can be generated and/or calculated, for example, via the statistical model using the following formula:

$$\frac{\text{number of candidates having a candidate matching score lower than } S}{\text{number of total candidates in the subset of candidates}}$$

where S is the candidate matching score of the candidate of interest. The fit score can include (or be), for example, a numerical range from 0 to 100 and indicates how strong the (or candidate) is to other similar candidates in the same job market defined by the target workforce data 202. For example, the statistical model can produce a fit score of 80 for the user based on the user matching score and/or the matching score distribution. The fit score of 80 means that the candidate is ranked higher than 80% of other candidates from the randomly-selected group of candidates in the same job market.

In some implementations, the method 400 can include using a second machine learning model to generate fit scores of candidates, other candidates, and/or future candidates. The second machine learning model can be or include any machine learning model, neural network, tree-based model, and/or the like. The second machine learning model can include (or be) a supervised machine learning model or an unsupervised machine learning model. In some implementations, the method 400 can include using the second machine learning model instead of the statistical model to generate fit scores of candidates. This is so, at least in part, to predict fit scores of future candidates without re-sampling candidates from the same job market. In some implementations, the second machine learning model 124 can be further trained using a training set that includes previously generated fit scores of candidates, candidate information (e.g., resume, job title, work experience, education, etc.), information about job listings (e.g., location, required skills, qualifications, benefits, etc.), information about the specific market (e.g., number of candidates in the specific market, influx/outflux of candidates in the specific market, etc.). In some cases, the training set can be labeled using the fit scores as the label. The training set can be used to train the second machine learning model to predict fit scores without using matching scores of candidates (which were used to generate fit scores via the statistical model).

At 430, the method 400 includes filtering the candidates from the randomly-selected group of candidates based on the fit scores and a fit score threshold, to produce a filtered candidate pool including a filtered subset of candidates. The fit score threshold can include, for example, a minimum and/or maximum value that a fit score of a candidate meets to be included in the filtered candidate pool. For instance, an employer operating a management device can input a signal indicating that the fit score threshold to be 90, enabling the processor to filter the group of randomly-selected candidates that have candidate matching scores of 90 or above.

At 435, the method 400 includes generating an appeal value for the target role data based on a comparison of (1) a plurality of role data from a role pool from the target workforce data associated with the filtered subset of candidates and (2) the target role data. The appeal value can include, for example, a numerical score and/or value indicating an attractiveness level the for the target role data (e.g., job listing provided by the employer) is to candidates, including candidates with high fit scores. In some implementations, the method 400 can include executing an optional third machine learning model to generate the appeal value for the target role data. The appeal value can also be generated based on market trends. For instance, the target role data can include natural language-based identifiers such as, for example, "remote" that appeals to a majority of candidates. The natural language-based identifiers can also include, for example, "free parking," "catered meals," "20 days paid time off," "maternal/paternal leave assistance," "H1-B visa sponsorship," and/or the like, that appeals to a majority of candidates. The processor can track traffic of candidates viewing and/or showing interest for job listings and/or roles and common features (e.g., natural language-based identifiers) they share.

At 440, the method 400 includes checking if the appeal value of the target role data matches with the fit scores of the candidates from the filtered subset of candidates. For instance, the processor can check if the target role data is appealing to candidates with higher fit scores.

At 445, if the appeal value does not match, the method 400 includes extracting a plurality of natural language-based identifiers from the plurality of role data having higher appeal values than the appeal value for the target role data. In some implementations, the method 400 can include executing, via the processor, a natural language extractor to extract the plurality of natural language-based identifiers.

At 450, the method 400 includes generating the role improvement recommendation based on the plurality of natural language-based identifiers extracted from the plurality of role data and the plurality of fit scores. For instance, the extracted natural language-based identifiers from role data having higher appeal values can be embedded into the target role data to improve the appeal value of the target role data and/or attract more candidates. The role improvement recommendation can be configured to increase the appeal value for the target role data. In some implementations, the method 400 can include executing, via the processor, a recommendation generator to generate the role improvement recommendation.

At 455, if the appeal value matches with the fit scores of the filtered subset of candidates or after the role improvement recommendation is generated, the method 400 includes generating a compound presentation to be displayed on the management device operated by the employer.

It is to be noted that any one or more of the aspects and embodiments described herein can be conveniently implemented using one or more machines (e.g., one or more compute devices that are utilized as a user compute device for an electronic document, one or more server devices, such as a document server, etc.) programmed according to the teachings of the present specification. Appropriate software coding can readily be prepared by skilled programmers based on the teachings of the present disclosure. Aspects and implementations discussed above employing software and/or software modules can also include appropriate hardware for assisting in the implementation of the machine executable instructions of the software and/or software module.

Such software can be a computer program product that employs a machine-readable storage medium. A machine-readable storage medium can be any medium that is capable of storing and/or encoding a sequence of instructions for execution by a machine (e.g., a compute device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM"

device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software can also include information (e.g., data) carried as a data signal on a data carrier, such as a carrier wave. For example, machine-executable information can be included as a data-carrying signal embodied in a data carrier in which the signal encodes a sequence of instruction, or portion thereof, for execution by a machine (e.g., a compute device) and any related information (e.g., data structures and data) that causes the machine to perform any one of the methodologies and/or embodiments described herein.

Examples of a compute device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a compute device can include and/or be included in a kiosk.

All combinations of the foregoing concepts and additional concepts discussed herewithin (provided such concepts are not mutually inconsistent) are contemplated as being part of the subject matter disclosed herein. The terminology explicitly employed herein that also can appear in any disclosure incorporated by reference should be accorded a meaning most consistent with the particular concepts disclosed herein.

The drawings are primarily for illustrative purposes, and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The entirety of this application (including the Cover Page, Title, Headings, Background, Summary, Brief Description of the Drawings, Detailed Description, Embodiments, Abstract, Figures, Appendices, and otherwise) shows, by way of illustration, various embodiments in which the embodiments can be practiced. The advantages and features of the application are of a representative sample of embodiments only, and are not exhaustive and/or exclusive. Rather, they are presented to assist in understanding and teach the embodiments, and are not representative of all embodiments. As such, certain aspects of the disclosure have not been discussed herein. That alternate embodiments cannot have been presented for a specific portion of the innovations or that further undescribed alternate embodiments can be available for a portion is not to be considered to exclude such alternate embodiments from the scope of the disclosure. It will be appreciated that many of those undescribed embodiments incorporate the same principles of the innovations and others are equivalent. Thus, it is to be understood that other embodiments can be utilized and functional, logical, operational, organizational, structural and/or topological modifications can be made without departing from the scope and/or spirit of the disclosure. As such, all examples and/or embodiments are deemed to be non-limiting throughout this disclosure.

Also, no inference should be drawn regarding those embodiments discussed herein relative to those not discussed herein other than it is as such for purposes of reducing space and repetition. For example, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure.

The term "automatically" is used herein to modify actions that occur without direct input or prompting by an external source such as a user. Automatically occurring actions can occur periodically, sporadically, in response to a detected event (e.g., a user logging in), or according to a predetermined schedule.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general-purpose processor, a central processing unit (CPU), a microprocessor, a digital signal processor (DSP), a controller, a microcontroller, a state machine and so forth. Under some circumstances, a "processor" can refer to an application specific integrated circuit (ASIC), a programmable logic device (PLD), a field programmable gate array (FPGA), etc. The term "processor" can refer to a combination of processing devices, e.g., a combination of a DSP and a microprocessor, multiple microprocessors, one or more microprocessors in conjunction with a DSP core or any other such configuration.

The term "memory" should be interpreted broadly to encompass any electronic component capable of storing electronic information. The term memory can refer to various types of processor-readable media such as random-access memory (RAM), read-only memory (ROM), non-volatile random-access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" can refer to one or more programs, routines, sub-routines, functions, procedures, etc. "Instructions" and "code" can comprise a single computer-readable statement or many computer-readable statements.

The term "modules" can be, for example, distinct but interrelated units from which a program may be built up or into which a complex activity may be analyzed. A module can also be an extension to a main program dedicated to a specific function. A module can also be code that is added in as a whole or is designed for easy reusability.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) can be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules can include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Various concepts can be embodied as one or more methods, of which at least one example has been provided. The acts performed as part of the method can be ordered in any suitable way. Accordingly, embodiments can be constructed in which acts are performed in an order different than illustrated, which can include performing some acts simultaneously, even though shown as sequential acts in illustrative embodiments. Put differently, it is to be understood that such features can not necessarily be limited to a particular order of execution, but rather, any number of threads, processes, services, servers, and/or the like that can execute serially, asynchronously, concurrently, in parallel, simultaneously, synchronously, and/or the like in a manner consistent with the disclosure. As such, some of these features can be mutually contradictory, in that they cannot be simultaneously present in a single embodiment. Similarly, some features are applicable to one aspect of the innovations, and inapplicable to others.

In addition, the disclosure can include other innovations not presently described. Applicant reserves all rights in such innovations, including the right to embodiment such innovations, file additional applications, continuations, continuations-in-part, divisionals, and/or the like thereof. As such, it should be understood that advantages, embodiments, examples, functional, features, logical, operational, organizational, structural, topological, and/or other aspects of the disclosure are not to be considered limitations on the disclosure as defined by the embodiments or limitations on equivalents to the embodiments. Depending on the particular desires and/or characteristics of an individual and/or enterprise user, database configuration and/or relational model, data type, data transmission and/or network framework, syntax structure, and/or the like, various embodiments of the technology disclosed herein can be implemented in a manner that enables a great deal of flexibility and customization as described herein.

All definitions, as defined and used herein, should be understood to control over dictionary definitions, definitions in documents incorporated by reference, and/or ordinary meanings of the defined terms.

The indefinite articles "a" and "an," as used herein in the specification and in the embodiments, unless clearly indicated to the contrary, should be understood to mean "at least one."

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A non-transitory, processor-readable medium storing instructions to cause a processor to:
    receive (1) target workforce data, (2) candidate pool data associated with the target workforce data, and (3) target role data associated with a job listing;
    execute a first machine learning model to generate a candidate matching score from a plurality of candidate matching scores for each candidate from a plurality of candidates that is randomly-selected from the candidate pool data indicating a level of matching for that candidate and the target role data, to produce a matching score distribution for the target workforce data based on the target workforce data, the candidate pool data, and the target role data;
    execute a statistical model to generate a fit score from a plurality of fit scores for each candidate from the plurality of candidates based on the matching score distribution, the fit score indicating a fit of that candidate to the target role data compared to remaining candidates from the plurality of candidates to the target role data;
    filter the plurality of candidates associated with the target workforce data based on the plurality of fit scores and a fit score threshold, to produce a filtered candidate pool that includes a filtered subset of candidates from the plurality of candidates;
    generate an appeal value for the target role data based on a comparison of (1) a plurality of role data from a role pool from the target workforce data associated with the filtered subset of candidates and (2) the target role data, the appeal value indicating appeal of the target role data;
    predict that the target role data is unappealing to the filtered candidate pool based on the appeal value;
    in response to predicting that the target role data is unappealing to the filtered candidate pool, extract a plurality of natural language-based identifiers from the plurality of role data having higher appeal values than the appeal value for the target role data;
    cause the target role data to embed at least one natural language-based identifier from the plurality of natural language-based identifiers to generate updated target role data associated with an updated appeal value that is more appealing than the appeal value;
    generate a trained second machine learning model by updating model parameters of a second machine learning model using a first subset of fit scores from the plurality of fit scores until a pre-defined likelihood of correctness is obtained by the trained second machine learning model;
    generate a tested second machine learning model by testing the trained second machine learning model using a second subset of fit scores from the plurality of fit scores;
    generate a validated second machine learning model by validating the tested second machine learning model using a third subset of fit scores from the plurality of fit scores;
    execute, without using the matching score distribution or the statistical model, the validated second machine learning model to generate a fit score for a future candidate not included in the plurality of candidates; and
    generate a role recommendation based on the fit score for the future candidate.

2. The non-transitory, processor-readable medium of claim 1, wherein the instructions to cause the processor to generate the candidate matching score from the plurality of candidate matching scores for each candidate from the plurality of candidates further includes instructions to cause the processor to:
    randomly select the plurality of candidates from the candidate pool data associated with the plurality of role data from the role pool, role data from the plurality of role data sharing a plurality of role features with the target role data; and
    generate the candidate matching score from the plurality of candidate matching scores for each candidate from the plurality of candidates from the candidate pool data, based on a comparison between (1) candidate data from a plurality of candidate data from the candidate pool data and (2) role data from the role pool, to produce the matching score distribution that is associated with the target workforce data.

3. The non-transitory, processor-readable medium of claim 1, wherein the instructions further include instructions to cause the processor to train the first machine learning model using a candidate pool training set that includes candidate raw data correlated to a role compatibility score.

4. The non-transitory, processor-readable medium of claim 1, wherein the instructions further include instructions to cause the processor to classify the plurality of candidates into a plurality of fit tiers based on the plurality of fit scores.

5. The non-transitory, processor-readable medium of claim 4, wherein the instructions further include instructions to parse the candidate pool data including candidate data for each candidate from the plurality of candidates of the candidate pool data, to identify a plurality of common features among the plurality of candidates from each fit tier from the plurality of fit tiers.

6. The non-transitory, processor-readable medium of claim 1, wherein the instructions to generate the fit score from the plurality of fit scores for each candidate from the plurality of candidates further include instructions to cause the processor to compare each candidate from the plurality of candidates to a subset of candidates from the plurality of candidates and for that candidate, each candidate from the plurality of candidates having a candidate matching score higher than a candidate matching score of each candidate from the subset of candidates and for that candidate.

7. The non-transitory, processor-readable medium of claim 1, wherein the instructions further include transmitting a role improvement recommendation to a management device, the role improvement recommendation displayed on a dashboard of the management device.

8. The non-transitory, processor-readable medium of claim 1, wherein the instructions further include instructions to cause the processor to identify a match between the target role data and the fit score threshold, based on the target role data or a plurality of candidates from the candidate pool data associated with the target role data.

9. The non-transitory, processor-readable medium of claim 8, wherein the first machine learning model includes an unsupervised machine learning model.

10. The non-transitory, processor-readable medium of claim 1, wherein the instructions further include instructions to cause the processor to generate a role fit score from a plurality of role fit scores for each role data from the role pool, based on a plurality of candidates from the candidate pool associated with each role data from the role pool.

11. The non-transitory, processor-readable medium of claim 1, wherein the instructions further include instructions to cause the processor to update a role fit score of the target role data based on an execution of a role improvement recommendation.

12. A method, comprising:
receiving (1) target workforce data, (2) candidate pool data associated with the target workforce data, and (3) target role data associated with a job listing;
executing a first machine learning model to generate a candidate matching score from a plurality of candidate matching scores for each candidate from a plurality of candidates that is randomly-selected from the candidate pool data indicating a level of matching for that candidate and the target role data, to produce a matching score distribution for the target workforce data based on the target workforce data, the candidate pool data, and the target role data;
executing a statistical model to generate a fit score from a plurality of fit scores for each candidate from the plurality of candidates based on the matching score distribution, the fit score indicating a fit of that candidate to the target role data compared to remaining candidates from the plurality of candidates to the target role data;
filtering the plurality of candidates associated with the target workforce data based on the plurality of fit scores and a fit score threshold, to produce a filtered candidate pool that includes a filtered subset of candidates from the plurality of candidates;
generating an appeal value for the target role data based on a comparison of (1) a plurality of role data from a role pool from the target workforce data associated with the filtered subset of candidates and (2) the target role data, the appeal value indicating appeal of the target role data;
predicting that the target role data is unappealing to the filtered candidate pool based on the appeal value;
in response to predicting that the target role data is unappealing to the filtered candidate pool, extracting a plurality of natural language-based identifiers from the plurality of role data having higher appeal values than the appeal value for the target role data;
causing the target role data to embed at least one natural language-based identifier from the plurality of natural language-based identifiers to generate updated target role data associated with an updated appeal value that is more appealing than the appeal value;
generating a trained second machine learning model by updating model parameters of a second machine learning model using a first subset of fit scores from the plurality of fit scores until a pre-defined likelihood of correctness is obtained by the trained second machine learning model;
generating a tested second machine learning model by testing the trained second machine learning model using a second subset of fit scores from the plurality of fit scores;
generating a validated second machine learning model by validating the trained second machine learning model using a third subset of fit scores from the plurality of fit scores;
executing without using the matching score distribution or the statistical model, the validated second machine learning model to generate a fit score for a future candidate not included in the plurality of candidates; and
generating a role recommendation based on the fit score for the future candidate.

13. The method of claim 12, wherein the executing the first machine learning model further includes:
randomly selecting the plurality of candidates from the candidate pool data associated with the plurality of role data from the role pool, role data from the plurality of role data sharing a plurality of role features with the target role data; and
generating the candidate matching score from the plurality of candidate matching scores for each candidate from the plurality of candidates from the candidate pool data, based on a comparison between (1) candidate data from a plurality of candidate data from the candidate pool data and (2) role data from the role pool, to produce the matching score distribution that is associated with the target workforce data.

14. The method of claim 12, further comprising:
training the first machine learning model using a candidate pool training set that includes candidate raw data correlated to a role compatibility score.

15. The method of claim 12, further comprising:
classifying the plurality of candidates into a plurality of fit tiers based on the plurality of fit scores.

16. The method of claim 15, wherein further comprising:
parsing the candidate pool data including candidate data for each candidate from the plurality of candidates of the candidate pool data, to identify a plurality of common features among the plurality of candidates from each fit tier from the plurality of fit tiers.

17. The method of claim 12, wherein the executing the statistical model further includes comparing each candidate from the plurality of candidates to a subset of candidates from the plurality of candidates and for that candidate, each candidate from the plurality of candidates having a candidate matching score higher than a candidate matching score of each candidate from the subset of candidates and for that candidate.

18. The method of claim 12, further comprising:
transmitting a role improvement recommendation to a management device, the role improvement recommendation displayed on a dashboard of the management device.

19. The method of claim 12, further comprising:
identifying a match between the target role data and the fit score threshold, based on the target role data or a plurality of candidates from the candidate pool data associated with the target role data.

20. The method of claim 19, wherein the first machine learning model includes an unsupervised machine learning model.

21. The method of claim 12, further comprising:
generating a role fit score from a plurality of role fit scores for each role data from the role pool, based on a plurality of candidates from the candidate pool associated with each role data from the role pool.

22. The method of claim 12, further comprising:
updating a role fit score of the target role data based on an execution of a role improvement recommendation.

* * * * *